(12) United States Patent
Chandran (10) Patent No.: US 12,160,767 B2
(45) Date of Patent: Dec. 3, 2024

(54) 5G NETWORK SLICE ASSIGNMENT AND MANAGEMENT

(71) Applicant: DISH Wireless L.L.C., Englewood, CO (US)

(72) Inventor: Premchand Chandran, Ashburn, VA (US)

(73) Assignee: DISH Wireless L.L.C., Littleton, CO (US)

( * ) Notice: Subject to any disclaimer, the term of this patent is extended or adjusted under 35 U.S.C. 154(b) by 205 days.

(21) Appl. No.: 17/450,763

(22) Filed: Oct. 13, 2021

(65) Prior Publication Data
US 2023/0111373 A1     Apr. 13, 2023

(51) Int. Cl.
*H04W 28/02*     (2009.01)
*H04W 72/543*    (2023.01)

(52) U.S. Cl.
CPC ... *H04W 28/0226* (2013.01); *H04W 28/0268* (2013.01); *H04W 72/543* (2023.01)

(58) Field of Classification Search
None
See application file for complete search history.

(56) References Cited

U.S. PATENT DOCUMENTS

| | | | |
|---|---|---|---|
| 9,648,581 B1* | 5/2017 | Vaynblat | H04L 67/535 |
| 2013/0065562 A1* | 3/2013 | Singh | H04W 28/0268 |
| | | | 455/414.1 |
| 2015/0026711 A1* | 1/2015 | Andersson | H04N 19/61 |
| | | | 725/14 |
| 2015/0334594 A1* | 11/2015 | Stephens | H04W 74/002 |
| | | | 705/14.64 |
| 2022/0286828 A1* | 9/2022 | Tiwari | H04W 4/46 |
| 2023/0049554 A1* | 2/2023 | Lei | H04W 48/18 |
| 2023/0067851 A1* | 3/2023 | Zeng | H04L 65/1069 |

FOREIGN PATENT DOCUMENTS

WO     WO2022064264     * 9/2020

* cited by examiner

*Primary Examiner* — Mohammad S Adhami
(74) *Attorney, Agent, or Firm* — Kilpatrick Townsend & Stockton LLP (57) ABSTRACT

Various arrangements for performing cellular network slice assignment are detailed herein. A cellular network can be used to provide cellular network service to user equipment (UE) using a first slice of the cellular network. The cellular network can receive from the UE a request to transition to a different slice of the cellular network that provides a quality of service (QoS) parameter that is greater than the QoS on an original slice. The cellular network can determine that the UE is eligible to be moved to the different slice based on a location of the UE. Based on receiving the request to transition and the location of the UE, the UE can be reassigned to the different slice of the cellular network.

20 Claims, 5 Drawing Sheets

5G NETWORK SLICE ASSIGNMENT AND MANAGEMENT

BACKGROUND

5G New Radio (NR) cellular networks allow for slicing. A cellular network slice, referred to herein as a "slice," functions as a virtual network operating on the underlying physical cellular network infrastructure. The parameters of each slice, such as the various Quality of Service (QoS) parameters and Quality of Experience (QoE) parameters, can be customized and vary. User equipment (UE), when connected with the cellular network, may be assigned to use a specific slice. Therefore, UE may receive significantly different levels of service based on which slice of the cellular network is being used to service the UE.

SUMMARY

Various embodiments are described related to a method for cellular network slice assignment. In some embodiments, a method for cellular network slice assignment is described. The method may comprise providing, by a cellular network, cellular network service to a user equipment (UE) using a first slice of the cellular network. A plurality of slices may be present on the cellular network, the first slice being part of the plurality of slices. The method may comprise receiving, by the cellular network from the UE, a request to transition to a second slice of the plurality of slices of the cellular network. The second slice may provide a quality of service (QoS) parameter that may be greater than the QoS on the first slice. The method may comprise determining, by the cellular network, that the UE may be eligible to be moved to the second slice based on a location of the UE. The method may comprise, based on receiving the request to transition and the location of the UE, reassigning, by the cellular network, the UE from the first slice to the second slice of the cellular network. The method may comprise selecting, by the cellular network, a piece of content to output via the UE. The method may comprise, based on the UE being assigned to the second slice, transmitting, by the cellular network, the selected content to the UE, where the UE may be triggered to present the selected piece of content.

Embodiments of such a method may include one or more of the following features: the method may comprise determining, by the cellular network, that the UE has physically left a designated assignment region. The method may comprise initiating, by the cellular network, a timer in response to the UE having physically left the designated assignment region. The method may comprise reassigning, by the cellular network, the UE to the first slice from the second slice based on the timer. The method may further comprise determining, by the cellular network, that the UE has physically left a designated assignment region. The method may further comprise reassigning, by the cellular network, the UE to the first slice from the second slice based on the UE having physically left the designated assignment region. The first slice may be a general consumer slice and the second slice may be a content opt-in slice. The content opt-in slice delivers network-selected content to UE provided service via the content opt-in slice. The method may further comprise determining, by the cellular network, a number of pieces of content transmitted to the UE via the second slice within a predefined period of time. Transmitting the piece of content may be performed based on the number of pieces of content. The method may further comprise, while the UE may be assigned to the second slice, receiving, by the cellular network, an opt-out message from the UE. The method may further comprise, in response to the opt-out message, reassigning the UE to the first slice. The cellular network may be a 5G New Radio (NR) cellular network. The piece of content may be an advertisement for an entity within a predefined distance of the location of the UE. The piece of content may be a coupon for an entity within a predefined distance of the location of the UE. The piece of content may be transmitted by the cellular network to the UE as a push notification.

In some embodiments, a cellular network slice assignment system is described. The system may comprise a 5G New Radio (NR) cellular network, comprising: a 5G core, a plurality of distributed units (DUs) and a plurality of centralized units (CUs). The system may comprise a slice assignment system that functions as part of the 5G NR cellular network. The slice assignment system, in combination with the 5G NR cellular network may be configured to provide cellular network service to a user equipment (UE) using a first slice of the 5G NR cellular network. A plurality of slices may be present on the 5G NR cellular network, the first slice being part of the plurality of slices. The system may be configured to receive from the UE, a request to transition to a second slice of the plurality of slices of the 5G NR cellular network. The second slice provides a quality of service (QoS) parameter that may be greater than the QoS on the first slice. The system may be configured to determine that the UE may be eligible to be moved to the second slice based on a location of the UE. The system may be configured to, based on receiving the request to transition and the location of the UE, reassign the UE from the first slice to the second slice of the cellular network. The system may be configured to select a piece of content to output via the UE. The system may be configured to, based on the UE being assigned to the second slice, transmit the selected content to the UE, where the UE may be triggered to present the selected piece of content.

Embodiments of such a system may include one or more of the following features. The slice assignment system, in combination with the 5G NR cellular network, may be configured to determine that the UE has physically left a designated assignment region. The system may be configured to initiate a timer in response to the UE having physically left the designated assignment region. The system may be configured to reassign the UE to the first slice of the cellular network from the second slice of cellular network based on the timer. The slice assignment system, in combination with the 5G NR cellular network, may be configured to determine that the UE has physically left a designated assignment region. The system may be configured to reassign the UE to the first slice of the cellular network from the second slice of cellular network based on the UE having physically left the designated assignment region. The first slice may be a general consumer slice and the second slice may be a content opt-in slice. The content opt-in slice may deliver network-selected content to UE provided service via the content opt-in slice. The slice assignment system, in combination with the 5G NR cellular network, may be configured to determine a number of pieces of content transmitted to the UE via the second slice within a predefined period of time. Transmitting the piece of content may be performed based on the number of pieces of content. The slice assignment system, in combination with the 5G NR cellular network, may be configured to, while the UE may be assigned to the second slice, receive an opt-out message from the UE. The system may be configured to, in response to the opt-out message, reassign the UE to the first slice. The piece of content may be an advertisement for an entity within a predefined distance of the location of the UE. The piece of content may be a coupon for an entity within a predefined distance of the location of the UE. The piece of content may be transmitted by the cellular network to the UE as a push notification. The system may further comprise a plurality of UE. The plurality of UE may comprise the UE; and the UE may be a smartphone.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Cellular network slicing, such as 5G cellular network slicing, is an architecture that allows multiple virtual networks to be present on a same physical network infrastructure. Various slices may be allocated differing network resources that allow network slices to serve specific groups of UE, user needs, and applications. For example, a first network slice may be present that delivers certain QoS/QoE parameters to consumers that enables reliable HD video streaming for UE of the consumers. A second network slice may be used for a group of UE associated with a particular corporate client that provides ultra-low latency communication between a cloud-based server system and UE associated with the corporate customer. A single underlying physical network can have at least two (and, likely, many more) slices operating on it, allowing for differing levels of service to be provided to different groups of UE.

A consumer, acting in only his or her personal capacity, may sign up for cellular service with a cellular network provider or a mobile virtual network operator (MVNO). The consumer may be provided with a level of service that the cellular network provider provides to all private consumers. Such a level of service may be sufficient for certain tasks (e.g., messaging, video, phone calls) but may be less than optimal for other tasks (e.g., high-definition video, 4K video, gaming, high-speed downloads/uploads). Therefore, if given the opportunity, the consumer may desire to upgrade their service, even if the upgrade is only temporary.

The cellular network operator may group consumers onto a first slice that provides the base level of service. If the consumer opts-in for a second slice, the consumer's UE, under certain conditions, may be transitioned to the second slice for a time. This second slice may provide at least some guaranteed level of service that is an upgrade over the first slice. For instance, the second slice may enable sufficient bandwidth for smooth viewing of 4K video or use of data without counting against a user's monthly cap. By opting-in to the second slice, the user of the UE may be required to agree to particular conditions, such as: allowing sharing of his or her location; allowing targeted content; content being output by the UE; responding to content; and/or some other requirement imposed by the cellular network operator.

In some embodiments, the user may be offered the option of selecting the type of service which the user most desires to be improved. Based upon the selection made by the user (e.g., from among gaming, video playback, downloading, web surfing), the second slice may be selected from multiple available slices that can be used as the second slice and offer varying performance increases in different parameters over the base consumer slice.

Figure 1:
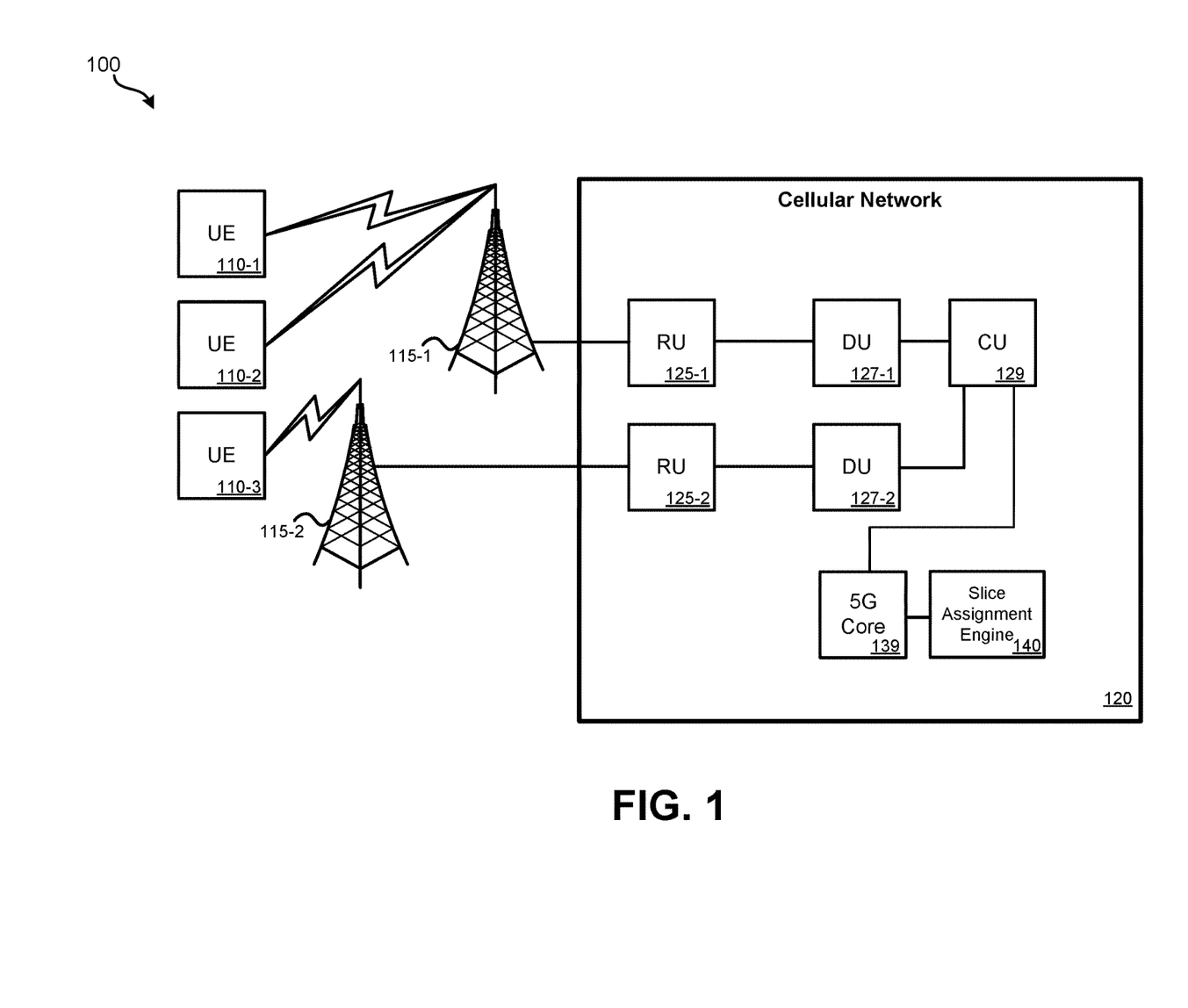
FIG. 1 illustrates an embodiment of a cellular network with an incorporated slice assignment system.

Further detail regarding such embodiments and other embodiments is provided in relation to the figures. FIG. 1 illustrates an embodiment of a cellular network system 100 (system 100") with an incorporated slice assignment system. System 100 can include a 5G New Radio (NR) cellular network or other types of cellular networks that permit slicing are also possible (e.g., future 6G and beyond cellular networks). System 100 can include: UE 110 (UE 110-1, UE 110-2, UE 110-3); base station 115; cellular network 120; radio units 125 ("RUs 125"); distributed units 127 ("DUs 127"); centralized unit 129 ("CU 129"); 5G core 139, and slice assignment engine 140. FIG. 1 represents a component level view. In an open radio access network (O-RAN), because components can be implemented as software in the cloud, except for components that need to receive and transmit RF, the functionality of the various components can be shifted among different servers and/or data centers to accommodate where the functionality of such components is needed and/or where processing, storage, and/or bandwidth are available.

UE 110 can represent various types of end-user devices, such as smartphones, cellular modems, cellular-enabled computerized devices, sensor devices, gaming devices, access points (APs), any computerized device capable of communicating via a cellular network, etc. Depending on the location of individual UEs, UE 110 may use RF to communicate with various base stations of cellular network 120. As illustrated, two base stations 115 (BS 115-1, 115-2) are illustrated. Real-world implementations of system 100 can include many (e.g., thousands) of base stations, RUs, DUs, and CUs. BS 115 can include one or more antennas that allow RUs 125 to communicate wirelessly with UEs 110. RUs 125 can represent an edge of cellular network 120 where data is transitioned to wireless communication. The radio access technology (RAT) used by RU 125 may be 5G New Radio (NR), or some other RAT. The remainder of cellular network 120 may be based on an exclusive 5G architecture, a hybrid 4G/5G architecture, a 4G architecture, or some other cellular network architecture. Base station equipment 121 may include an RU (e.g., RU 125-1) and a DU (e.g., DU 127-1).

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. One or more DUs, such as DU 127-1, may communicate with CU 129.

Collectively, RUs, DUs, and CUs create a gNodeB, which serves as the radio access network (RAN) of cellular network 120. CU 129 can communicate with 5G core 139. The specific architecture of cellular network 120 can vary by embodiment. Edge cloud server systems outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

Multiple slices may function on the underlying hardware detailed in FIG. 1. That is, UE 110-1 and UE 110-2, while communicating with the same base station, may be provided with different QoS/QoE levels of service by virtue of these UEs being assigned to different slices. Each slice may be associated with differing performance characteristics. For each slice, many characteristics or parameters may be defined, such as: downlink/uplink throughput (aggregate for network slice); downlink/uplink throughput (per UE); maximum downlink/uplink throughput; maximum supported packet size; mission critical level (e.g., compared to other network slices); radio spectrum; packet error rate; supported access technologies; supported device velocity for a defined QoS; uplink throughput (aggregate for network slice); maximum uplink throughput; and/or synchronicity. Other parameters for a slice may also be defined, such as: a defined latency range for specific end-points; reserved or shared spectrum; one or more particular security profiles; optimization for specific applications or sets of applications (e.g., healthcare applications, industrial applications); optimization for high-speed mobility; and varying degrees of customer-side control of network parameters. Other parameters may also be defined, such as parameters for individual layers within each network slice. Such individual layers may allow for particular types of data or data associated with particular applications to be prioritized over other applications.

By adjusting such parameters, the user of a UE may experience varying quality of experience for different tasks that the user is attempting to perform. For instance, low latency may allow for a high quality gaming experience. Latency may be less important compared to downlink bandwidth if the user desires to stream high-definition video.

While multiple slices may function on the hardware detailed in FIG. 1, not all slices may be available in all geographic regions where the cellular network provides service. For example, a first slice that provides service to a particular building or group of UE may only be available in the geographic region where the building is located or where the UE are expected to be present a majority of the time. If outside the region where the first slice is available, the UE may be assigned to a general consumer slice or to a second slice that is available and is identified as having similar performance characteristics to the first slice.

Slice assignment engine 140 may be one or more computer servers or a process that is executed by a cloud-based computing platform. Slice assignment engine 140 may be in communication with 5G core 139 and/or other components of cellular network 120. Slice assignment engine 140, at a general level, may manage assignment of UE to various slices, such as based on whether a user of the UE has opted-in a program that provides improved performance in exchange for monitoring, content output, and/or some other requirement. Further detail regarding slice assignment engine 140 is provided in relation to FIG. 2.

Figure 2:
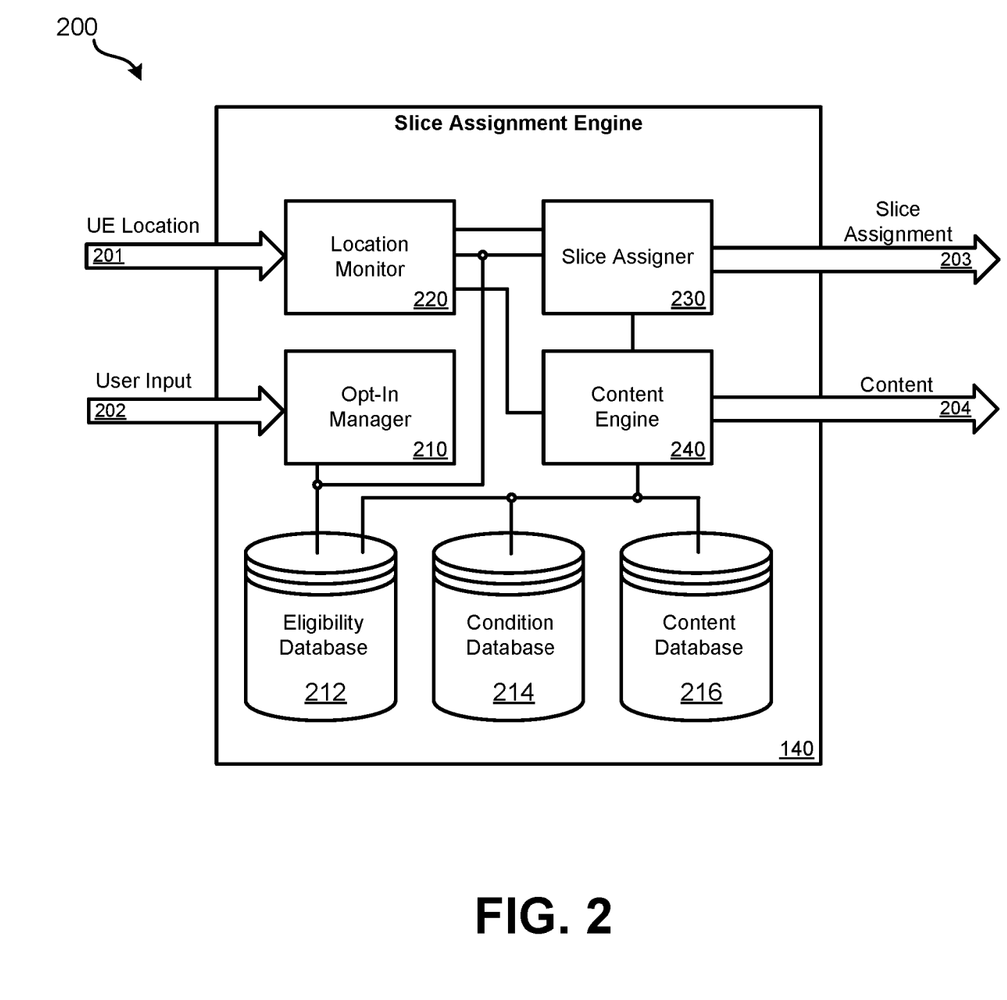
FIG. 2 illustrates an embodiment of a slice assignment system.

FIG. 2 illustrates an embodiment of a slice assignment system ("system 200"). System 200 can include: slice assignment engine 140, which may receive UE locations 201 and user input 202 as input and may output slice assignments 203 and content 204. Slice assignment engine 140 can include: opt-in manager 210; location monitor 220; slice assigner 230; and content engine 240. Slice assignment engine 140 can also include various data storage arrangements including: eligibility database 212; condition database 214; and content database 216.

Slice assignment engine 140 can include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD). Similarly, eligibility database 212; condition database 214; and content database 216 can be stored using such non-transitory processor-readable mediums. Further, some or all of the components of slice assignment engine 140 can be executed as one or more processes and/or stored remotely using a cloud-based computing platform.

Opt-in manager 210 may maintain eligibility database 212 that indicates which UE have opted-in or opted-out to slice-based UE management. A user, via her UE, may be presented with an option to opt-in or opt-out from a program that modifies the quality of experience and/or quality of service experienced by the user via the UE when connected with the cellular network. The user may be unaware of the slice management aspect, but rather may be focused on the end-user QoE level she is experiencing. Opt-in manager 210 may present an end-user agreement to a user via the user's UE. Presentation of the end-user agreement may be based upon the UE's location. In other embodiments, the end-user agreement is presented regardless of the UE's location, but might only go into effect based on the UE's location. The end-user agreement may offer the user of the UE various benefits, such as: 1) improved cellular service (e.g., one or more improved QoS or QoE parameters). This improvement may be made in exchange for: 1) the right for the cellular network to serve content (e.g., advertisements, coupons) to the UE; 2) the right for the UE's location to be monitored; and/or 3) data regarding the UE's movement in relation to cellular network partners (e.g., a store that has sent content to UE). These factors may only be in effect when the UE is in one or more predefined geographical areas.

For example, if a user has opted-in via opt-in manager 210 on his UE, the UE's location may only be monitored when the user is within or nearby a particular shopping mall. In some embodiments, the improved cellular service may also only be active within the same geographic area (e.g., the shopping mall). In other embodiments, one or more of the benefits may remain active for a time period after the user leaves the geographic area. As an example, if the user visits the shopping mall, while at the mall, the user may be served one or more pieces of content specific to stores within the mall. After the user leaves the mall, he may no longer receive content, but may receive the benefit of the higher QoS/QoE of the alternative slice for a period of time, such as for the next day or week. In other embodiments, the time period may be defined differently, such as a time from when the alternative slice is assigned for the UE. Other measures besides time may also be used to trigger reassignment of the UE off of the alternative slice, such as total downlink or uplink bandwidth used while assigned to the alternative slice meeting a threshold value.

When a user has accepted the end-user agreement on her UE, opt-in manager 210 may receive user input 202 indicating as such and may store an indication that the UE is opted-in to eligibility database 212. The user may be permitted to opt-out at any time by providing user input 202 indicating as such. If an opt-out occurs, opt-in manager 210 may update eligibility database 212 accordingly. Once opted-in and recorded to eligibility database 212, a user may not need to perform any additional action other than entering the geographic that triggers use of a content-enabled slice. Therefore, over time, a UE may be reassigned to the content-enabled slice multiple times by entering the geographic trigger area (and, possibly, meeting one or more additional qualifications) based on opting in once.

Location monitor 220 may receive indications of where UE that have opted in are located. UE location 201 may indicate the geographic location of the UE. The UE may remain on its current slice (e.g., a base consumer slice) until slice assigner 230 modifies this assignment. When location monitor 220 determines that UE location 201 is within a geographic area for which activation of a content-enabled slice is available, slice assigner 230 may be triggered.

Based on the location of a UE as received by location monitor 220 and based on a UE having been indicated as eligible in eligibility database 212, slice assigner 230 may reassign the UE from a first slice to a second slice. In some embodiments, this involves a UE being transitioned from a general consumer slice (i.e., for a private party that has a consumer contract with the cellular network provider) to a content-enabled slice. In some embodiments, the reassignment to the content-enabled slice may be time limited. For example, the UE may only be reassigned to the second slice for a maximum period of time, such as 3 hours, to prevent abuse. The content enabled slice provides an improvement in QoE and/or at least one QoS parameter. For example, based on the parameters of the content-enabled slice, a UE's downlink bandwidth may be doubled or set to some other value selected by the cellular network operator. Slice assigner 230 may transmit an updated slice assignment 203 to the cellular network, such as to 5G Core 139. In some embodiments, eligibility database 212 is updated by slice assigner 230 to indicate that the UE is currently assigned to the content-enabled slice. Additionally or alternatively, slice assigner 230 may transmit an indication of UE that have been assigned (or removed) from the content-enabled slice to content engine 240.

Content engine 240 may, based on the location of a UE, the UE being eligible, and the UE presently being on the content-enabled slice, select a piece of content to be presented or otherwise output by the UE. As an example, a piece of content for a particular store may be presented or otherwise output when the UE has been assigned to the content-enabled slice and the UE is within a defined distance of the store (or of a competitor of the store). Content engine 240 may use one or more thresholds, such as a total number of pieces of content permitted to be sent to the UE and/or a rate of pieces of content (e.g., pieces of content per time period) that are permitted to be sent to the UE. Condition database 214 may define the conditions under which a particular piece of content is to be output to a UE, such as based on geographic location, time of day, day or week, a profile of the user of the UE, etc.

Content 204, selected and sent by content engine 240, may be transmitted to the UE via the content-enabled slice of the cellular network. Content 204 may be presented as a push notification, an SMS, an MIMS, via an application installed on the UE, or may automatically trigger video and/or audio to be output by the UE (e.g., via an app or directly via the operating system). In some embodiments, the user may be able to interact with the content, such as by liking/disliking it or by acknowledging that the user has viewed the content.

Location monitor 220 may continue to monitor UE location 201. When the UE moves outside of the geographic region, which triggers the UE to be reassigned to the content-enabled slice, slide assigner 230 may be triggered to reassign the UE back to its previous slice (e.g., the base consumer slice). In other embodiments, the UE may be permitted to stay on the content-enabled slice for a period of time, during which content may or may not be sent to the UE. For example, after being present in the geographic area (and, possibly having received at least a threshold number of pieces of content), the UE may be permitted to stay on the content-enabled slice for a defined period of time, such as one additional day or one additional week. During this time, the UE would be able to take advantage of the improved QoE and QoS of the content-enabled slice. In some embodiments, the UE may be transitioned to a third slice, which may also have one or more improved QoE/QoS parameters (over the base slice that the UE is assigned), but on which network-selected content may not be sent to the UE for output.

Figure 3:
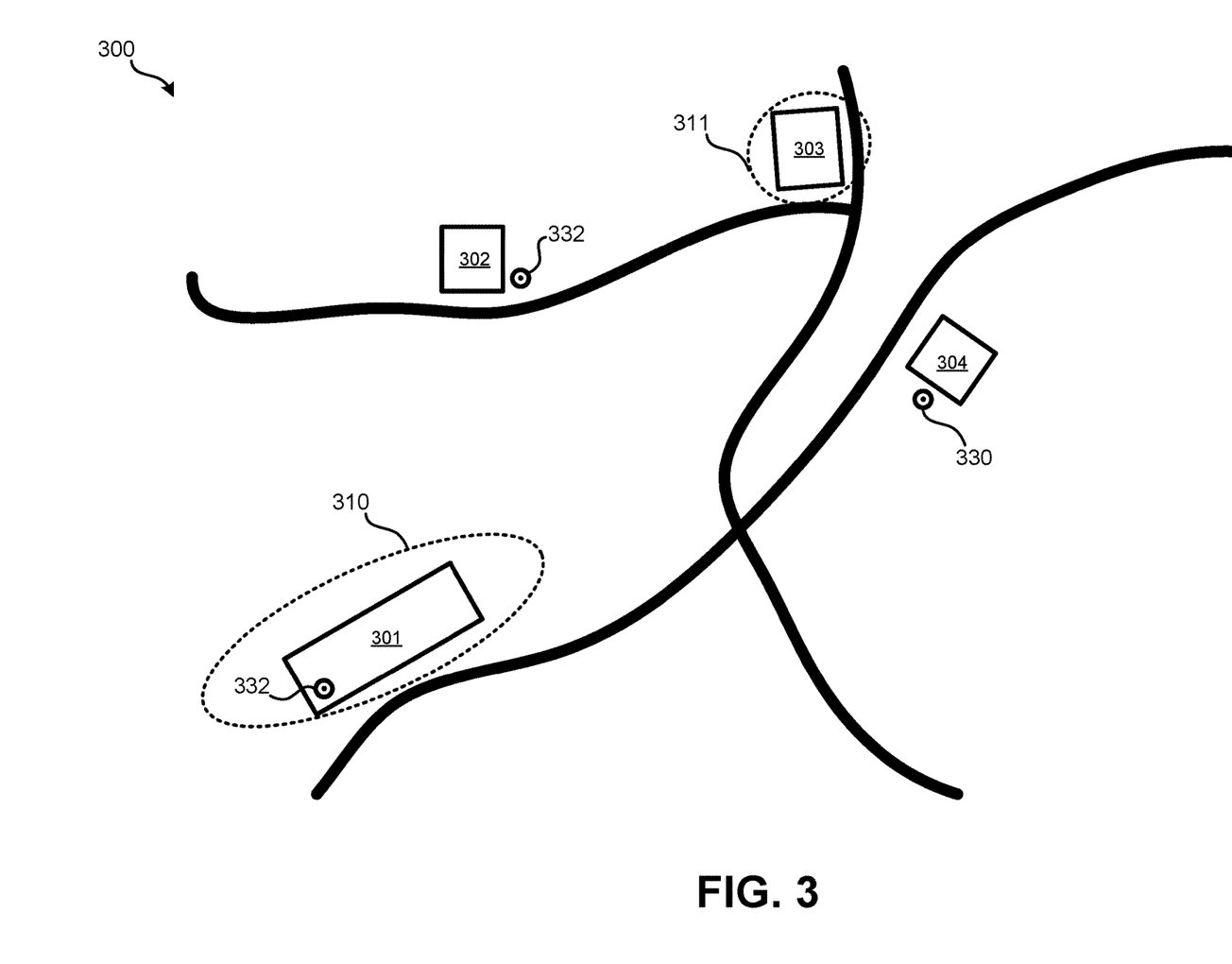
FIG. 3 illustrates an embodiment of a slice assignment for a UE based on user input.

FIG. 3 illustrates an embodiment 300 of slice assignment for a UE based on user input and location. A UE may first be present at location 330 near the UE's owner's home 304. Prior to entering region 310 or upon entering region 310, an end-user agreement for improved cellular network performance can be offered to the user via the UE. In some embodiments, the user may be permitted to make a selection as to which end-user service the user most desires to be improved, such as: media playback; gaming; streaming from the UE (e.g., uploading); latency; web surfing; bandwidth; etc. If the user assents and/or makes a selection, when the UE is within region 310, such as at location 332 in building 301, the UE may be transitioned to a second cellular network slice that has one or more improved performance characteristics. If the user was permitted to select an end-user service, the second slice, which functions as the content-enabled slice, can be selected by the cellular network based on the user's selection.

While the UE is within region 310, the UE may remain serviced using the second slice. During this time, the UE may also be provided content and/or tracked based on the terms and conditions to which the user previously assented. Upon exiting from region 310, the UE may be transitioned by the cellular network back to the previous slice the UE was assigned, such as a base consumer slice. Therefore, if the UE travels to location 332 at house 302, the UE may not be serviced using the second slice. However, if the UE is at some point within region 311 (which may be another region in which the second slice is available) at building 303, the UE may be again transitioned to the second slice.

Figure 4:
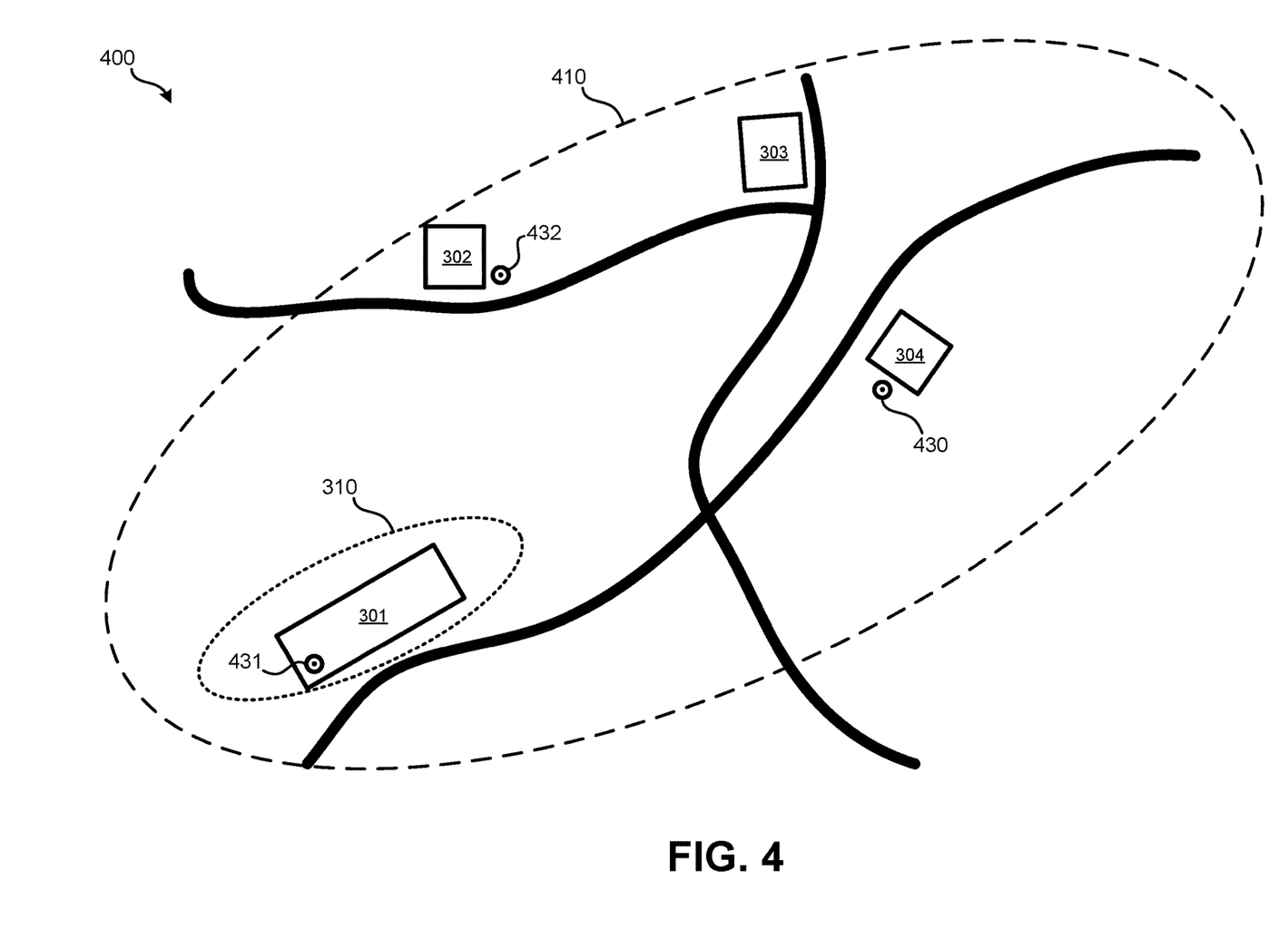
FIG. 4 illustrates another embodiment of slice assignment for a UE based on user input.

While in embodiment 300 the UE is only provided with service via the second slice when in a particular geographic region, in embodiment 400, use of the second slice within a particular geographic region "earns" the UE the right to continue to use the slice for at least a time outside of the triggering geographic region. FIG. 4 illustrates an embodiment 400 of slice assignment for a UE based on user input. A UE may first be present at location 430 near the UE's owner's home 304. Prior to entering region 310 or upon entering region 310, an end-user agreement for improved cellular network performance can be offered to the user via the UE. In some embodiments, the user may be permitted to make a selection as to which end-user service the user most desires to be improved, such as: media playback; gaming; streaming from the UE (e.g., uploading); latency; web surfing; bandwidth; etc. At this point, because the UE has not yet operated within triggering geographic region 310, the UE continues to operate on its current slice, such as the base consumer slice.

If the user has assented (and, possibly, has made a selection), when the UE is within region 310, such as at location 431 in building 301, the UE may be transitioned to a second cellular network slice that has one or more improved performance characteristics. If the user was permitted to select an end-user service, the second slice can be selected by the cellular network based on the user's selection. This second slice can also permit content to be served to the UE and/or location and/or usage tracking of the UE to be performed.

When the UE moves outside of region 310, the UE may continue to use the second slice such as for up to a time period (e.g., one hour, one day, one week), which may be triggered based on the UE leaving region 310, which can be determined using geofencing. Geofencing can involve comparing GNSS coordinates of the UE with a stored map that defines a region. The map could be stored by the cellular network. Alternatively, the UE's location could be more generally based on which beam of a base station with which the UE is communicating. In some embodiments, the UE may be transitioned to a third slice that has one or more improved performance characteristics, which can be selected based on the user's previous selection. Whether the UE remains on the second slice or is transitioned to a third slice, the access to the second or third slice may be offered within geographic region 410. Therefore, for example, at location 432, the UE gains the benefit of using the second or third slice until a time period permitted for the access expires. Access to the second or third slice may not be permitted outside region 410 or, in some embodiments, the UE may be transitioned to another available slice that is available and is similar or most closely matches the level of service being provided by the second or third slice within region 410.

In some embodiments, the UE being present within region 310 that triggers access to the improved performance slice over larger geographic region 410 may be subject to certain triggering conditions. For example, the cellular network may monitor the location of the UE to determine it remains within region 310 for at least a predefined period of time (e.g., one hour). As another example, the UE may be required to output at least a predefined number of pieces of content in order to trigger access to the second or third slice over geographic region 410.

Once the time period expires, the UE may be transitioned back to the UE's original slice, such as the base consumer slice. In other embodiments, the user may have the option of permitting tracking and/or content being provided to the UE in order to continue using the second or third slice.

Figure 5:
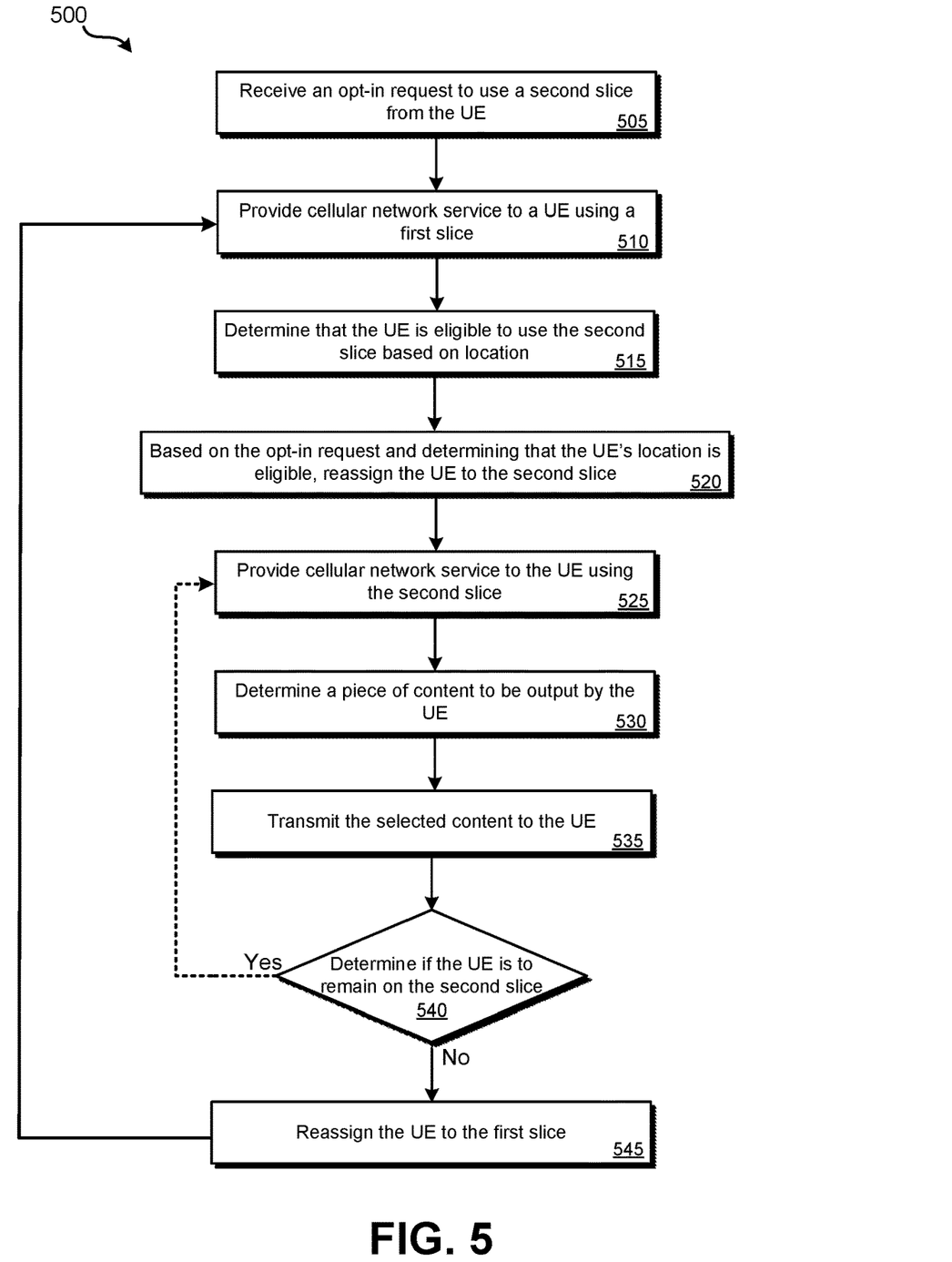
FIG. 5 illustrates an embodiment of a method for slice assignment.

Various methods may be performed using the systems detailed in relation to FIGS. 1 and 2. FIG. 5 illustrates an embodiment of a method 500 for slice assignment. Method 500 may be performed using system 100, which can include the components of slice assignment engine 140 of FIG. 2.

At block 505, an opt-in request can be received from a UE. This opt-in request can be received by the cellular network, such as at an opt-in manager of a slice assignment engine. The opt-in request may have been received in response to an end-user agreement presented to the user via the UE (or via some other device, on paper, or some other method). In some embodiments, a request for a selection among various services that the user desires to have improved may be presented. The user may be offered: 1) the opportunity to select a cellular service which the user desires improved; and 2) conditions that must be assented to regarding location tracking, usage tracking and/or content presentation.

At block 510, cellular service may be provided to the UE using a first slice. This slice may be the base slice that the UE is assigned to by the cellular network outside of the opt-in program to which the user has assented at block 505. For example, the first slice may be a general consumer slice to which direct individual consumers of the cellular network are grouped. This first slice may provide or guarantee that a set of QoE and/or QoS parameters of a user agreement are met.

At block 515, a determination may be made that, based on location of the UE (e.g., as determined by a global navigation satellite system (GNSS) on-board the UE and transmitted to the cellular network), the UE is eligible to be reassigned to the second slice. The second slice can provide at least one or more performance improvements over the set of QoE and/or QoS parameters of the first slice. Additionally, the second slice allows for additional tracking of the UE's location and/or usage, and/or for content to be served to the UE for presentation or other form of output to the user, such as in the form of a text message, video, audio, or via an application installed on the UE.

At block 520, based on the opt-in request and the UE being eligible based on location, the UE may be reassigned by the cellular network to the second slice. The second slice may be selected from multiple slices based on the user's indicated cellular service for which improvement is desired at block 505. This reassignment to another slice can be performed by the slice assignment engine of the cellular network. In some embodiments, a message may be sent to the UE for output for presentation to indicate to the user that the reassignment has occurred. At block 525, cellular network service can be provided via the second slice, which can include the improved performance.

At block 530, while the UE is being serviced by the second slice, a piece of content may be selected by the cellular network and output to the UE for presentation or other form of output. The UE's location and/or usage may be monitored in accordance with the end-user agreement agreed to by the user as part of the opt-in for receiving access to the second slice. The piece of content may be selected based on the UE's location and/or usage. For example, if a user is near a particular store, a coupon or advertisement for the store, or a competitor of the store, may be output to the UE for output to the user. As another example, if the user accesses a website of a particular retailer, an advertisement or coupon for the retailer or a competitor may be output to the UE. In some embodiments, the selection of the content is performed using artificial intelligence, such as machine learning. A training set of data can be created based on characteristics of other users and which pieces of content resulted in a "success," which could be defined as the user viewing the content, going to the relevant store, and/or using a coupon. This training set of data could be used to train a machine learning model that could be used to score and select a particular piece of content for delivery to the UE based on characteristics of the user, the UE, the UE's location, etc.

At block 535, the selected content may be transmitted to the UE. The UE may be triggered to output or present the content. The content may be presented as a text message (e.g., SMS, MMS), video, audio, push notification, or within an installed application.

At block 540, a determination may be made as to whether the UE should remain on the second slice. The UE may remain on the second slice if it is still within the geographic region that triggered reassignment of the UE to the second slice at block 525, such as detailed in relation to FIG. 3. The UE may also remain on the second slice if it is outside of the geographic region of block 525 but is within a larger geographic region that permits continued access to the second slice, such as detailed in relation to FIG. 4. (Alternatively, such as detailed in relation to FIG. 4, if outside the triggering geographic region, but within the larger geographic region that permits continued access, the UE may be reassigned to a third slice that provided the improvement performance characteristic, possibly without the location or usage tracking and/or without the content being output by the UE to the user.) The determination of block 540 may be based on whether a time period has expired If the determination at block 540 is no, method 500 can proceed to block 545. At block 545, the UE may be reassigned by the cellular network back to the first slice. The UE may then return to receiving the base QoS/QoE in accordance with the first slice, along with the decreased location tracking, usage tracking, and/or content delivery. If the determination at block 540 is yes, method 400 can return to block 425, and the UE can continue to receive improved QoS/QoE performance via the second or third slice (along with the location tracking, usage tracking, and/or content delivery).

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for cellular network slice assignment, the method comprising:
   providing, by a cellular network, cellular network service to a user equipment (UE) using a first slice of a plurality of slices present on the cellular network;
   presenting, by the cellular network at the UE:
      (1) a request for a selection of a type of cellular service from a plurality of types of cellular service which a user of the UE desires to have improved; and
      (2) conditions that must be assented to indicating that improved service is provided in exchange for permitting location tracking of the UE while the UE is within a particular geographic area;
   receiving, by the cellular network from the UE, an opt-in request to transition to a second slice of the plurality of slices of the cellular network based on the selection made by the user in response to the presented request for selection, wherein:
      each type of cellular service from the plurality of types of cellular service is mapped to a different cellular network slice; and
      the second slice provides a quality of service (QOS) parameter that is greater than the QoS on the first slice for the selected type of cellular service;
   determining, by the cellular network, that the UE is eligible to be moved to the second slice;
   based on receiving the request to transition, reassigning, by the cellular network, the UE from the first slice to the second slice of the cellular network; and
   based on receiving the request to transition, tracking, by the cellular network, the location of the UE while the UE is within the particular geographic area.

2. The method for the cellular network slice assignment of claim 1, further comprising:
   determining, by the cellular network, that the UE has physically left a designated assignment region;
   initiating, by the cellular network, a timer in response to the UE having physically left the designated assignment region; and
   in response to a time period of the timer having expired, reassigning, by the cellular network, the UE to the first slice from the second slice.

3. The method for the cellular network slice assignment of claim 1, further comprising:
   determining, by the cellular network, that the UE has physically left a designated assignment region; and
   reassigning, by the cellular network, the UE to the first slice from the second slice based on the UE having physically left the designated assignment region.

4. The method for the cellular network slice assignment of claim 1, wherein:

the first slice is a general consumer slice and the second slice is a content opt-in slice; and
the content opt-in slice delivers network-selected content to UE provided service via the content opt-in slice.

5. The method for the cellular network slice assignment of claim 1, further comprising:
determining, by the cellular network, a number of pieces of content transmitted to the UE via the second slice within a predefined period of time, wherein: transmitting a piece of content is performed based on the number of pieces of content.

6. The method for the cellular network slice assignment of claim 1, further comprising:
while the UE is assigned to the second slice, receiving, by the cellular network, an opt-out message from the UE; and
in response to the opt-out message, reassigning the UE to the first slice.

7. The method for the cellular network slice assignment of claim 1, wherein the cellular network is a 5G New Radio (NR) cellular network.

8. The method for the cellular network slice assignment of claim 1, further comprising:
transmitting, by the cellular network, a piece of content to the UE, wherein the UE presents the piece of content, and the piece of content is an advertisement for an entity within a predefined distance of the location of the UE.

9. The method for the cellular network slice assignment of claim 1, further comprising:
transmitting, by the cellular network, a piece of content to the UE, wherein the UE presents the piece of content, and the piece of content is a coupon for an entity within a predefined distance of the location of the UE.

10. The method for cellular network slice assignment of claim 1, further comprising:
transmitting, by the cellular network, a piece of content to the UE, wherein the UE presents the piece of content, and the piece of content is transmitted by the cellular network to the UE as a push notification.

11. A cellular network slice assignment system, comprising:
a user equipment (UE) that presents:
(1) a request for a selection of a type of cellular service from a plurality of types of cellular service which a user of the UE desires to have improved; and
(2) conditions that must be assented to indicating that improved service is provided in exchange for permitting location tracking of the UE while the UE is within a particular geographic area;
a 5G New Radio (NR) cellular network, comprising: a 5G core, a plurality of distributed units (DUs) and a plurality of centralized units (CUs); and
a slice assignment system that functions as part of the 5G NR cellular network, wherein the slice assignment system, in combination with the 5G NR cellular network is configured to:
provide cellular network service to the UE using a first slice of a plurality of slices present on the 5G NR cellular network;
receive, from the UE, an opt-in request to transition to a second slice of the plurality of slices of the 5G NR cellular network based on the selection made by the user in response to the presented request for selection, wherein:
via the request, the user selects the type of cellular service from a plurality of types of cellular service that the user desires to be improved in exchange for permitting location tracking of the UE while the UE is within the particular geographic area; and
each type of cellular service from the plurality of types of cellular service is mapped to a different cellular network slice; and
the second slice provides a quality of service (QOS) parameter that is greater than the QoS on the first slice for the selected type of cellular service;
determine that the UE is eligible to be moved to the second slice;
based on receiving the request to transition, reassign the UE from the first slice to the second slice of the cellular network; and
based on receiving the request to transition, tracking, by the cellular network, the location of the UE while the UE is within the particular geographic area.

12. The cellular network slice assignment system of claim 11, wherein the slice assignment system, in combination with the 5G NR cellular network, are configured to:
determine that the UE has physically left a designated assignment region;
initiate a timer in response to the UE having physically left the designated assignment region; and
in response to a time period of the timer having expired, reassign the UE to the first slice of the cellular network from the second slice of cellular network.

13. The cellular network slice assignment system of claim 11, wherein the slice assignment system, in combination with the 5G NR cellular network, are configured to:
determine that the UE has physically left a designated assignment region; and
reassign the UE to the first slice of the cellular network from the second slice of the cellular network based on the UE having physically left the designated assignment region.

14. The cellular network slice assignment system of claim 11, wherein:
the first slice is a general consumer slice and the second slice is a content opt-in slice; and
the content opt-in slice delivers network-selected content to UE provided service via the content opt-in slice.

15. The cellular network slice assignment system of claim 11, wherein the slice assignment system, in combination with the 5G NR cellular network, are configured to:
determine a number of pieces of content transmitted to the UE via the second slice within a predefined period of time, wherein: transmitting a piece of content is performed based on the number of pieces of content.

16. The cellular network slice assignment system of claim 11, wherein the slice assignment system, in combination with the 5G NR cellular network, are configured to:
while the UE is assigned to the second slice, receive an opt-out message from the UE; and
in response to the opt-out message, reassign the UE to the first slice.

17. The cellular network slice assignment system of claim 11, wherein the slice assignment system, in combination with the 5G NR cellular network is further configured to transmit a piece of content to the UE for presentation and the piece of content is an advertisement for an entity within a predefined distance of the location of the UE.

18. The cellular network slice assignment system of claim 11, wherein the slice assignment system, in combination with the 5G NR cellular network is further configured to transmit a piece of content to the UE for presentation and the piece of content is a coupon for an entity within a predefined distance of the location of the UE.

19. The cellular network slice assignment system of claim 11, wherein the slice assignment system, in combination with the 5G NR cellular network is further configured to transmit a piece of content to the UE for presentation and the piece of content is transmitted by the cellular network to the UE as a push notification.

20. The cellular network slice assignment system of claim 11, further comprising a plurality of UE, wherein the plurality of UE comprises the UE; and the UE is a smartphone.

\* \* \* \* \*